US011301723B2

(12) United States Patent
Nitta

(10) Patent No.: US 11,301,723 B2
(45) Date of Patent: Apr. 12, 2022

(54) DATA GENERATION DEVICE, DATA GENERATION METHOD, AND COMPUTER PROGRAM PRODUCT

(71) Applicant: KABUSHIKI KAISHA TOSHIBA, Minato-ku (JP)

(72) Inventor: Shuhei Nitta, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/798,543

(22) Filed: Feb. 24, 2020

(65) Prior Publication Data

US 2020/0342266 A1  Oct. 29, 2020

(30) Foreign Application Priority Data

Apr. 23, 2019 (JP) .............................. JP2019-081831

(51) Int. Cl.
*G06K 9/62* (2006.01)
*G06N 5/04* (2006.01)
*G06N 3/08* (2006.01)

(52) U.S. Cl.
CPC ............. *G06K 9/6262* (2013.01); *G06N 3/08* (2013.01); *G06N 5/046* (2013.01)

(58) Field of Classification Search
CPC ............. G06K 9/6262; G06K 2209/01; G06K 9/6271; G06N 5/046; G06N 3/08
USPC ......................................................... 382/156
See application file for complete search history.

(56) References Cited

U.S. PATENT DOCUMENTS

2019/0294963 A1* 9/2019 Sasaya ................. G06K 9/6267
2020/0334529 A1* 10/2020 Nitta ....................... G06N 3/084

FOREIGN PATENT DOCUMENTS

JP  2020-135465 A  8/2020

OTHER PUBLICATIONS

Zhang, "Beyond a Gaussian Denoiser: Residual Learning of Deep CNN for Image Denoising" airXiv publication date Aug. 13, 2016.*
Simonyan et al., "Deep Inside Convolutional Networks: Visualising Image Classification Models and Saliency Maps", in arXiv: 1312.6034v2, Apr. 19, 2014, 8 pages.
Nguyen et al., "Synthesizing the preferred inputs for neurons in neural networks via deep generator networks", in arXiv: 1605.09304v5, 29th Conference on Neural Information Processing Systems (NIPS), Nov. 23, 2016, 29 pages.
Zhou et al., "Learning Deep Features for Discriminative Localization", in IEEE Conference on Computer Vision and Pattern Recognition (CVPR), 2016, pp. 2921-2929.

* cited by examiner

*Primary Examiner* — Juan A Torres
(74) *Attorney, Agent, or Firm* — Oblon, McClelland, Maier & Neustadt, L.L.P.

(57) ABSTRACT

A data generation device includes one or more processors. The processors input input data into a neural network and obtain an inference result of the neural network The processors calculate a first loss and a second loss. The first loss becomes smaller in value as a degree of matching between the inference result and a target label becomes larger. The target label indicates a correct answer of the inference. The second loss is a loss based on a contribution degree to the inference result of a plurality of elements included in the input data and the target label. The processors update the input data based on the first loss and the second loss.

9 Claims, 4 Drawing Sheets

DATA GENERATION DEVICE, DATA GENERATION METHOD, AND COMPUTER PROGRAM PRODUCT

CROSS-REFERENCE TO RELATED APPLICATIONS

This application is based upon and claims the benefit of priority from Japanese Patent Application No. 2019-081831, filed on Apr. 23, 2019; the entire contents of which are incorporated herein by reference.

FIELD

Embodiments described herein relate generally to a data generation device, a data generation method, and a computer program product.

BACKGROUND

A technique for analyzing the basis of inference by a neural network has been proposed. For example, a technique for estimating an input image that maximizes an output (model output) of the neural network by optimizing a loss function that becomes smaller as the model output becomes larger with a random image as an initial value has been proposed. Further, a technique in which a generator that generates an input image from a random number vector is separately learned, and an input image that maximizes the model output is generated from the random number vector using the generator has been proposed.

However, in the prior art, the accuracy of estimation (generation) of input data (such as an input image) may be reduced. For example, since the prior art uses simple regularization such as L2 regularity, the model output becomes large, but an unnatural input image may be generated.

DETAILED DESCRIPTION

According to one embodiment, a data generation device includes one or more processors. The processors input input data into a neural network and obtain an inference result of the neural network The processors calculate a first loss and a second loss. The first loss becomes smaller in value as a degree of matching between the inference result and a target label becomes larger. The target label indicates a correct answer of the inference. The second loss is a loss based on a contribution degree to the inference result of a plurality of elements included in the input data and the target label. The processors update the input data based on the first loss and the second loss.

Exemplary embodiments of a data generation device according to the present invention will be explained below in detail with reference to the accompanying drawings.

Hereinafter, a learning device that learns a neural network that performs inference using an image as input data will be described as an example. More specifically, an image classification problem of 10 classes for classifying an input image (two-dimensional image) into any of numbers 0 to 9 will be described as an example. An applicable process is not limited to this, and the learning device can be applied to other inference processing (including recognition processing, classification processing, and regression processing). For example, the learning device can also be applied to a classification process other than 10 classes such as a classification process of one class (such as abnormality detection). The learning device can also be applied to inference using a three-dimensional image, inference of an inference target (such as a specific speaker) from speech data, and inference using text data.

The present embodiment introduces regularization based on the contribution degree of inference (recognition) of a neural network. This regularization improves the estimation accuracy of an input image (an example of input data). In the present embodiment, learning such as a generator is not necessary. The input image means an image input to the neural network. The input image includes, for example, an image that is an initial value and an image that is updated and estimated based on the initial image. Hereinafter, an image that is an initial value may be referred to as an initial image, and an estimated image may be referred to as an estimated image.

Figure 1:
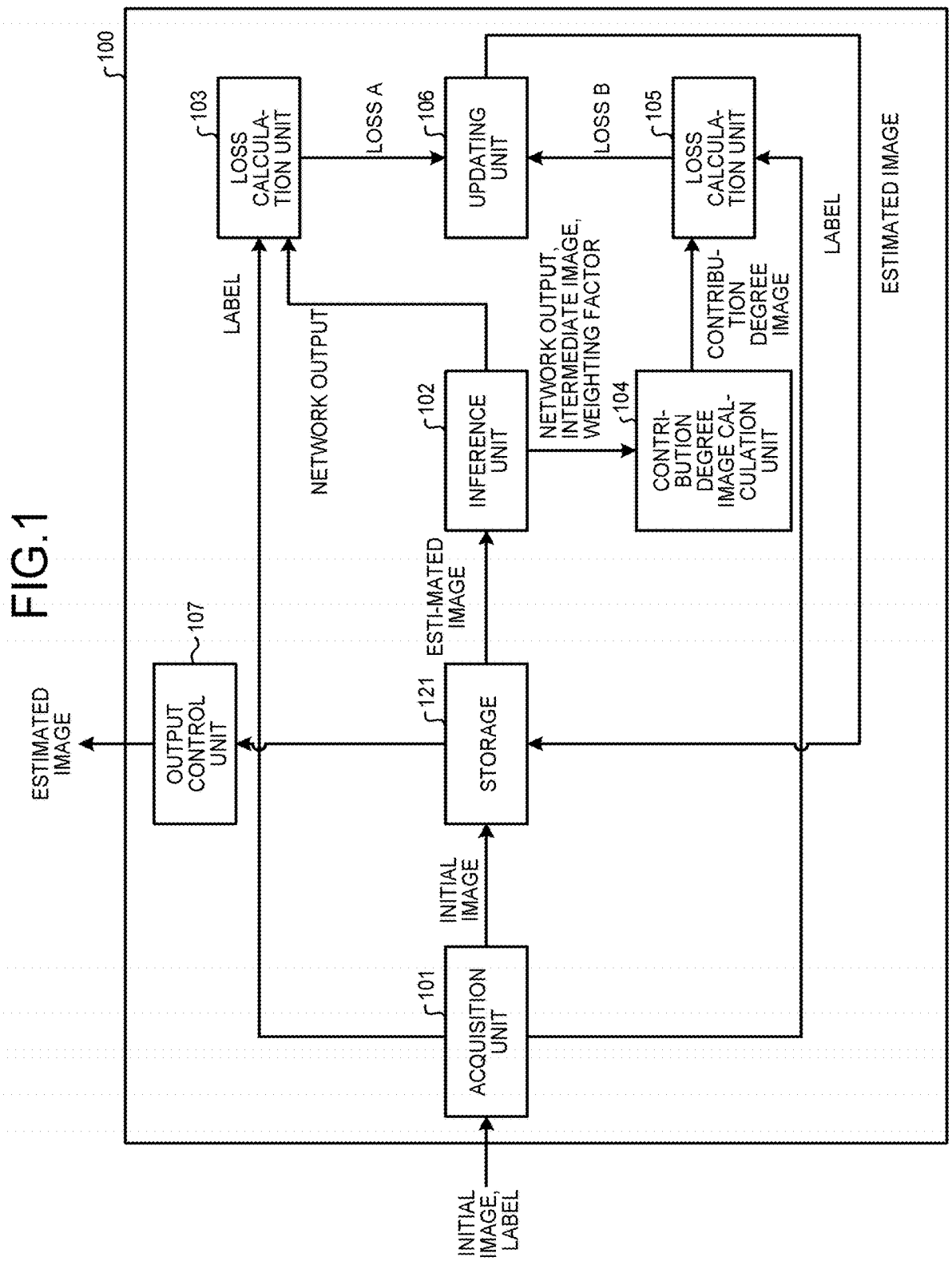
FIG. 1 is a block diagram of a data generation device according to the present embodiment.

FIG. 1 is a block diagram illustrating a data generation device 100 according to the present embodiment. The data generation device 100 includes storage unit 121, an acquisition unit 101, an inference unit 102, a loss calculation unit 103, a contribution-degree image calculation unit 104, a loss calculation unit 105, an updating unit 106, and an output control unit 107.

The storage 121 stores various types of data used for various processes by the data generation device 100. For example, the storage 121 stores a parameter that defines a learned neural network, an initial image, and an estimated image. The parameter that defines the neural network is, for example, a weighting factor and a bias.

The storage 121 can be configured by any storage medium generally used such as a flash memory, a memory card, a Random Access Memory (RAM), a Hard Disk Drive (HDD), and an optical disk.

The acquisition unit 101 acquires various types of information used in various processes by the data generation device 100. For example, the acquisition unit 101 acquires an initial image and a target label indicating a correct answer of inference. Any method may be used for the acquisition unit 101 to acquire the initial image and the target label. For example, the acquisition unit 101 may acquire the initial image and the target label stored in the storage 121 by reading or may acquire the initial image and the target label from a server device outside the data generation device 100 by receiving.

The inference unit 102 performs an inference by a neural network with respect to the input image (initial image and estimated image). For example, the inference unit 102 inputs an input image to a neural network and obtains an inference result output from the neural network.

The loss calculation unit 103 calculates a loss used for updating the input image. Loss is also called error. For example, the loss calculation unit 103 calculates a loss (hereinafter also referred to as loss A) whose value becomes smaller as the degree (likelihood) that the inference result from the inference unit 102 matches the target label becomes larger.

The contribution-degree image calculation unit 104 generates a contribution-degree image (an example of contribution-degree data) indicating a region that contributes to the inference of the input image when the input image is input to the neural network. The contribution-degree image can be interpreted as an image (data) indicating the degree of contribution (focus) (attention degree, contribution degree) at the time of inference for each region (such as pixel). The contribution-degree image is sometimes called a saliency map. Details of a generation method for a contribution-degree image will be described later.

The loss calculation unit 105 calculates a loss used for updating the input image. For example, the loss calculation unit 105 calculates a loss (hereinafter also referred to as loss B) based on the contribution degree to the inference result of a plurality of pixels (elements) included in the input image and the target label.

Note that the loss calculation unit 103 and the loss calculation unit 105 do not have to be separated, and one configuration unit (loss calculation unit) may calculate both the loss A and the loss B.

The updating unit 106 updates the input image based on the loss A and the loss B, and generates a new input image (estimated image). For example, the updating unit 106 updates the input image by an error-back propagation method so that the loss (such as the weighted sum of the loss A and the loss B) considering both the loss A and the loss B becomes smaller. The updating method is not limited to the error-back propagation method, and any method may be used.

The output control unit 107 controls the output of various types of information from the data generation device 100. For example, the output control unit 107 outputs the estimated image updated (generated) by the updating unit 106. Any method of outputting information by the output control unit 107 may be used. For example, as the output control unit 107, there may be used a method for displaying information on a display device such as a display, a method for outputting (printing) information using an output device such as a printer, and a method for transmitting information to an external device such as a server device via a network.

Each of the above units (acquisition unit 101, inference unit 102, loss calculation unit 103, contribution-degree image calculation unit 104, loss calculation unit 105, updating unit 106, and output control unit 107) is realized by, for example, one or a plurality of processors. For example, each of the above units may be realized by causing a processor such as a Central Processing Unit (CPU) to execute a program, that is, by software. Each of the above units may be realized by a processor such as a dedicated Integrated Circuit (IC), that is, by hardware. Each of the above units may be realized by using software and hardware together. When a plurality of processors is used, each processor may realize one of the respective units, or may realize two or more of the respective units.

Further, the data generation device 100 may be physically configured by one device or may be physically configured by a plurality of devices. For example, the data generation device 100 may be constructed on a cloud environment.

Figure 2:
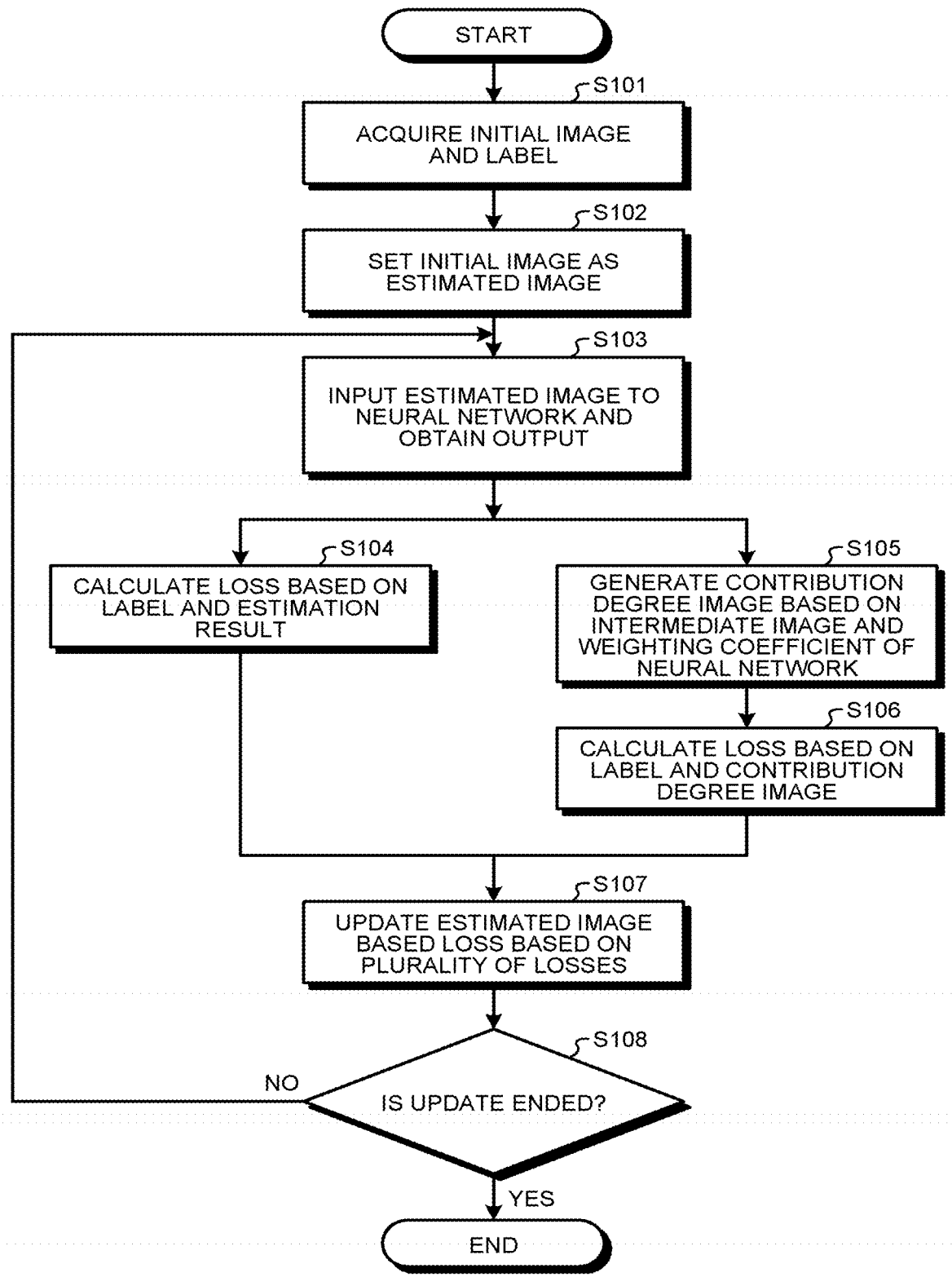
FIG. 2 is a flowchart of an estimation process in the present embodiment.

Next, an estimation process for an estimated image performed by the data generation device 100 according to the present embodiment configured as described above will be described. FIG. 2 is a flowchart illustrating an example of the estimation process in the present embodiment.

First, the acquisition unit 101 acquires an initial image and a label (step S101). In the following, the input image is represented by x and the label is represented by t.

Figure 3:
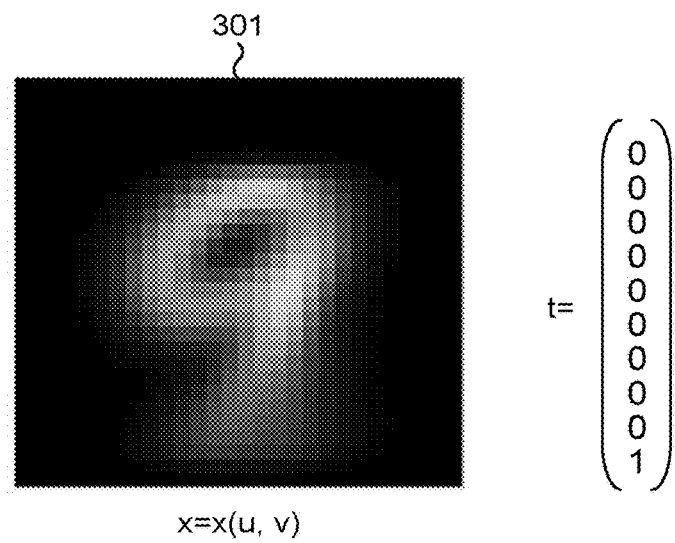
FIG. 3 is a diagram illustrating an example of an initial image.

FIG. 3 is a diagram illustrating an example of the initial image. The initial image is, for example, a pixel set having a horizontal width W and a vertical width H, and is a W×H-dimensional vector. As illustrated in FIG. 3, an initial image 301 is represented as x (u, v). u represents the pixel position in the horizontal direction, and v represents the pixel position in the vertical direction.

The label t is a 10-dimensional vector in which the element corresponding to the correct answer of the inference based on the input image is 1 and the other elements are 0. As illustrated in FIG. 3, in the case of the initial image x with the correct answer "9", the label t is expressed as $(0,0,0,0,0,0,0,0,0,1)^T$. Hereinafter, in the label t, an element indicating a correct answer may be referred to as a target label, and other elements may be referred to as non-target labels.

The initial image may be any image, and a different image can be used as the initial image depending on the purpose or the like. For example, the following image can be used as the initial image.

Image equivalent to the average of training data corresponding to the target label among the training data used during neural network learning Predetermined actual image Image equivalent to the average of training data corresponding to a plurality of labels including target labels and non-target labels Image with zero pixel values (zero image)

Image with random pixel values (random image)

Although FIG. 2 illustrates an example in which the initial image itself is received from the outside, the acquisition unit 101 may receive information for generating an initial image and generate the initial image using the information. For example, the acquisition unit 101 may receive parameters such as an average and variance of random numbers, and generate an initial image using the received parameters.

The acquisition unit 101 sets (stores) the acquired initial image in the storage 121 as an initial value of the estimated image (step S102). Hereinafter, the estimated image may be expressed as an estimated image x.

Next, the inference unit 102 inputs the estimated image x to the neural network, and obtains an output y that is an inference result of the neural network with respect to this input (step S103). The output y is expressed by the following equation (1).

$$y = f(w, x) \quad (1)$$

f is a function of the neural network that holds a weighting coefficient set w. For example, the function f repeats the process of a plurality of layers such as a convolution layer, a fully connected layer, a normalization layer, and a pooling layer, and outputs a 10-dimensional vector having the same number of dimensions as the label t. It is assumed that the output vector of the function f is a value after a softmax process, all elements are non-negative values, and the sum of elements is normalized to 1.

Next, based on the label and the inference result (output y), the loss calculation unit 103 calculates the loss A that becomes smaller as the degree of matching between the output y and the target label becomes larger (step S104). For example, the loss calculation unit 103 calculates the loss A ($L_A$) by the following equation (2).

$$L_A = t^T \ln(y) \quad (2)$$

Next, the contribution-degree image calculation unit 104 generates a contribution-degree image based on intermediate layer data (intermediate image) and a parameter (weighting coefficient) of the neural network (step S105). The contribution-degree image s is generated by, for example, the following expression (3).

$$s=g(w,x) \qquad (3)$$

g is a function that outputs a contribution-degree image based on the weighting coefficient set w of the neural network and the estimated image x. As the contribution-degree image, for example, Class Activation Mapping shown in B. Zhou, A. Khosla, A. Lapedriza, A. Oliva, A. Torralba, "Learning Deep Features for Discriminative Localization", In IEEE Conference on Computer Vision and Pattern Recognition (CVPR), pp. 2921-2929, 2016 (Non-patent Literature). can be used. When Class Activation Mapping is used, the function that linearly synthesizes the intermediate image of the neural network when the weighting coefficient set x is inferred with the value of the weighting coefficient set w related to the target label is used as the function g. The intermediate image is an image corresponding to the output of the intermediate layer of the neural network.

Figure 4:
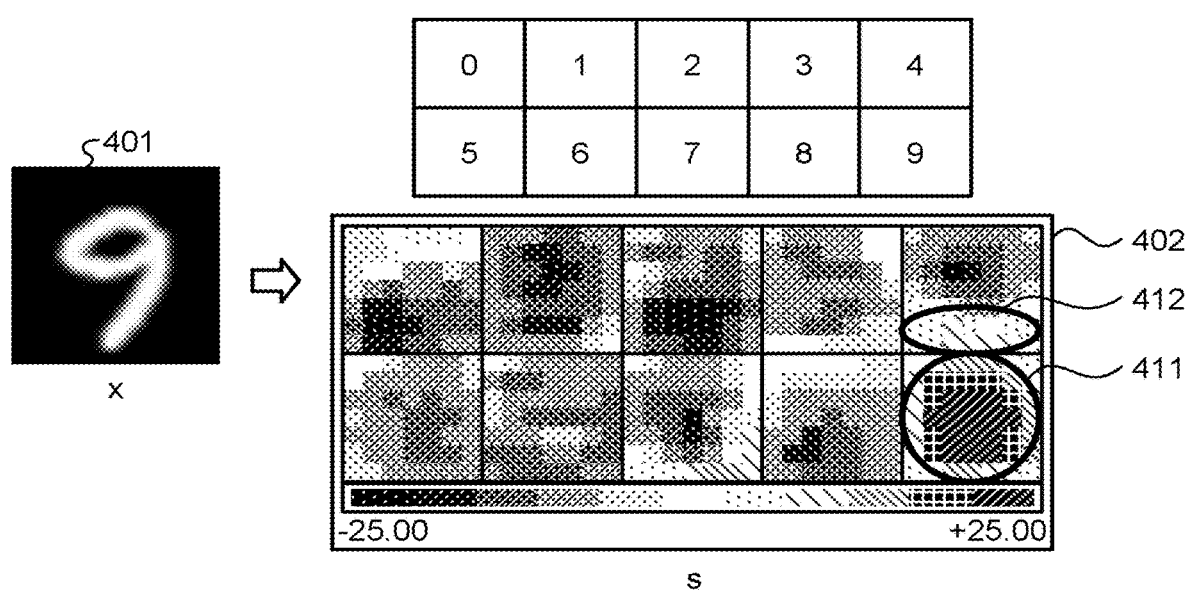
FIG. 4 is a diagram illustrating an example of a contribution-degree image.

FIG. 4 is a diagram illustrating an example of the contribution-degree image. FIG. 4 illustrates an example of the contribution-degree image 402 calculated based on the inference result for the input image 401 whose correct answer is "9". The numerical values (0 to 9) above the contribution-degree image 402 represents the inference result corresponding to each of the ten elements of the contribution-degree image 402. The contribution-degree image 402 is an image having pixel values corresponding to the contribution degree of inference. In FIG. 4, the difference in pixel value (contribution degree) is represented by the difference in the type of hatching. However, for example, as in Non-patent Literature, the pixel value (contribution degree) may be represented by color.

In the example of FIG. 4, a pixel 411 of the contribution-degree image corresponding to "9" and a pixel 412 corresponding to a part of the contribution-degree image corresponding to "4" are pixels having a large contribution degree.

The contribution-degree image illustrated in FIG. 4 is an example, and any other contribution-degree image may be used. Many methods of calculating the contribution-degree image can calculate the contribution degree for each element of the output y, as in the example of FIG. 4. Although the vertical and horizontal widths of the contribution-degree image differ depending on the calculation method, in present embodiment, the contribution-degree image is calculated with the same vertical and horizontal widths as the estimated image x. That is, in the present embodiment, the contribution-degree image s is a (W×H×C) dimensional vector. C corresponds to the number of classes to be classified. In the present embodiment, C=10.

As described above, the contribution-degree image is an image indicating a region that contributes to the inference of the input image when the input image is input to the neural network. The region that contributes to the inference include, for example, a region that has a large influence on inference results due to changes in the value of the region, a region that is obtained by reversing the neural network path from the active part of the output, etc.

Returning to FIG. 2, the loss calculation unit 105 calculates the loss B, which is a regularization term based on the contribution-degree image s, based on the label and the contribution-degree image s (step S106). For example, the loss calculation unit 105 calculates the sum of the pixel values of the contribution-degree image s for the target label as the loss B ($L_B$) as in the following equation (4).

$$L_B = \Sigma_v \Sigma_u s(u,v,c) \qquad (4)$$

Here, c is a value indicating an element corresponding to the target label in the label t. s(u, v, c) represents the pixel value of the contribution-degree image corresponding to the pixel position u in the horizontal direction, the pixel position v in the vertical direction, and the target label c. The loss B in the equation (4) can be interpreted as a loss whose value becomes smaller as the contribution degree to the inference result that matches the target label becomes larger. Instead of the equation (4), a loss whose value becomes smaller as the contribution degree to the inference result that matches the non-target label (inference result that does not match the target label) becomes smaller may be loss B.

Note that if the value corresponding to the sum of the pixel values of the contribution-degree image s as shown in the equation (4) can be calculated, it is not necessary to generate the contribution-degree image in step S105.

Next, the updating unit 106 updates the value of the estimated image x based on the loss $L_A$ and the loss $L_B$ by a method such as an error-back propagation method, and generates a new estimated image (step S107).

Next, the updating unit 106 determines whether or not the update is ended (step S108). The updating unit 106 determines the end of the update, based on, for example, the absolute value of loss (such as the weighted sum of the loss $L_A$ and the loss $L_B$), the reduction range of loss, and the number of updates of the estimated image (number of processes from step S103 to step S107). When the update is continued (step S108: No), the process returns to step S103 and the process is repeated. When it is determined that the update has been ended (step S108: Yes), the estimation process is ended. Thereafter, for example, the output control unit 107 may output the estimated image thus estimated.

As described above, in the present embodiment, when the input data (input image) that maximizes the output of the neural network is estimated, the regularization term based on the contribution-degree image representing the contribution degree to the output of the neural network is introduced. As a result, the estimation accuracy of the estimated image can be improved.

As in the present embodiment, it is possible to interpret and understand what the neural network has learned by estimating input data that increases the output of the learned neural network. As a result, it becomes possible to explain the basis of the estimation by the neural network (show transparency) and notice the bias of the training data. That is, the neural network can be debugged by the estimated input data.

It is also possible to implicitly approximate the relationship between an input and an output with a neural network, and estimate an input that increases the output of the network. That is, the method of the present embodiment can be applied to find new input data (input pattern) that increases the output.

Modification 1

The estimation process may be not only a classification process for classifying into another class but also a regression process, for example. For example, a neural network that inputs an image of a design drawing and outputs characteristics (such as efficiency or durability) may be targeted. In this case, for example, the loss calculation unit 103 calculates the loss A that becomes smaller as the characteristic becomes larger according to the following equation (5).

$$L_A = \exp(-y) \quad (5)$$

The loss A is not limited to a loss that becomes smaller as the output (such as characteristics) of the neural network becomes larger. For example, the loss A may be designed from the viewpoint of bringing the output closer to a specific value (corresponding to the target label). A specific value may be set to 0, and the loss A may be designed to become smaller as the output approaches 0.

In the case of a regression process, the target label may not be used. In such a case, the loss calculation unit 105 calculates the loss B that is a regularization term based on the contribution-degree image s without using the target label. For example, the loss calculation unit 105 calculates the sum of the pixel values of the contribution-degree image s as the loss B ($L_B$) as in the following equation (6). s (u, v) represents the pixel value of the contribution-degree image corresponding to the pixel position u in the horizontal direction, and the pixel position v in the vertical direction.

$$L_B = \Sigma_v \Sigma_u s(u,v) \quad (6)$$

As described above, the input data is not limited to an image. For example, a neural network that inputs a parameter (such as text data) at the time of manufacturing a processed product such as temperature and time and outputs characteristics may be targeted. In this case, the method of the present embodiment can be applied to estimate a parameter that outputs a better characteristic.

Audio data may be input data. For example, a neural network that inputs voice data and outputs a voice recognition result may be targeted. When such a neural network is targeted, it is possible to estimate an input that increases the recognition accuracy (output) while controlling the timing (time) contributing to speech recognition.

Modification 2

The loss calculation unit 105 may calculate the following value as the loss B in addition to the above equation (4).

(LB1) Maximum pixel value of contribution-degree image (LB2) Error between contribution-degree image and initial image (LB3) Error with predetermined distribution of contribution-degree image In the case of LB2, it is more effective that the initial image is not a random image or a zero image, but a natural and meaningful image. For example, an input image (such as an image of a design drawing) having the best performance at the time of estimating the estimated image is set as the initial image. This makes it possible to estimate input data (such as an input image) that further increases the output of the neural network while fixing the position of the element that contributes to inference.

The predetermined distribution of LB3 is, for example, a distribution in which a large value is set at the position of contribution. For example, when an estimated image that increases the output of the neural network under the condition that an airplane is included in the upper right region is estimated, an image having a large pixel value in the upper right region can be used as the predetermined distribution. This makes it possible to estimate input data (such as an input image) that further increases the output of the neural network while controlling the appearance position of the pattern that contributes to inference.

The error used in LB2 and LB3 may be calculated by any method. For example, normalized cross-correlation or mean square error can be used.

Figure 5:
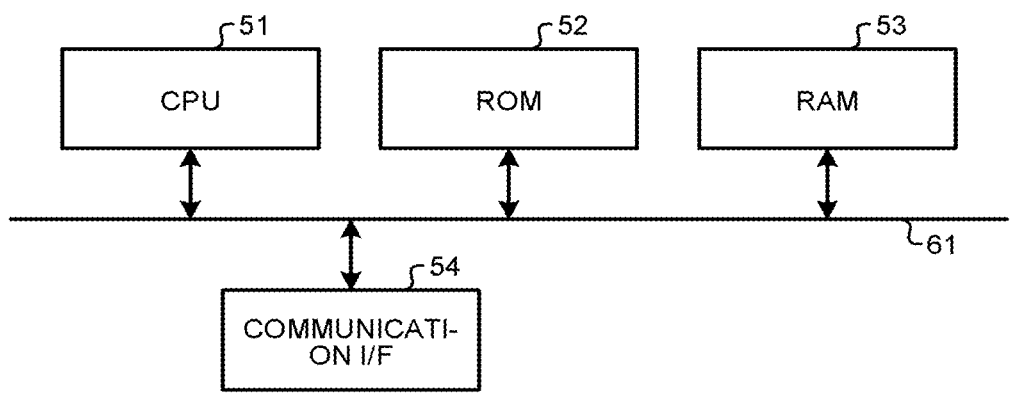
FIG. 5 is a hardware configuration diagram of a data generation device according to the present embodiment.

Next, the hardware configuration of the data generation device according to the present embodiment will be described with reference to FIG. 5. FIG. 5 is an explanatory diagram illustrating the hardware configuration example of the data generation device according to the present embodiment.

The data generation device according to the present embodiment includes a control device such as a CPU 51, a storage device such as a ROM (Read Only Memory) 52 and a RAM 53, a communication I/F 54 that communicates by connecting to a network, and a bus 61 that connects each unit.

A program executed by the data generation device according to the present embodiment is provided by being incorporated in advance in the ROM 52 or the like.

The program executed by the data generation device according to the present embodiment may be provided as a file in an installable format or an executable format and a computer program product by being recorded in a computer-readable recording medium such as a Compact Disk Read Only Memory (CD-ROM), a flexible disk (FD), a Compact Disk Recordable (CD-R), and a Digital Versatile Disk (DVD).

Furthermore, the program executed by the data generation device according to the present embodiment may be stored on a computer connected to a network such as the Internet and provided by being downloaded via the network. The program executed by the data generation device according to the present embodiment may be provided or distributed via a network such as the Internet.

The program executed by the data generation device according to the present embodiment can cause a computer to function as each unit of the data generation device described above. In this computer, the CPU 51 can read and execute a program from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generation device comprising:
one or more processors configured to:
input input data into a neural network and obtain an inference result of the neural network;
calculate a first loss and a second loss, the first loss becoming smaller in value as a degree of matching between the inference result and a target label becomes larger, the target label indicating a correct answer of the inference, the second loss being a loss based on a contribution degree to the inference result of a plurality of elements included in the input data and the target label; and
update the input data based on the first loss and the second loss.

2. The data generation device according to claim 1, wherein the second loss has a value that becomes smaller as the contribution degree to an inference result that matches the target label becomes larger.

3. The data generation device according to claim 1, wherein the second loss has a value that becomes smaller as the contribution degree to an inference result that does not match the target label becomes smaller.

4. The data generation device according to claim 1, wherein the one or more processors generate contribution-degree data indicating a contribution degree for each of the plurality of elements, and
the second loss has a value that becomes smaller as an error between the contribution-degree data and predetermined data becomes smaller.

5. The data generation device according to claim 1, wherein the one or more processors output the updated input data.

6. The data generation device according to claim 4, wherein the predetermined data is an initial value of the inference result.

7. A data generation device comprising:
one or more processors configured to:
inputting input data into a neural network and obtain an inference result of the neural network;
calculating a first loss and a second loss, the first loss becoming smaller in value as a value of the inference result becomes larger, or the inference result approaches a specific value, the second loss being a loss based on a contribution degree to the inference result of a plurality of elements included in the input data; and
updating the input data based on the first loss and the second loss.

8. A data generation method comprising:
inputting input data into a neural network and obtaining an inference result of the neural network;
calculating a first loss and a second loss, the first loss becoming smaller in value as a degree of matching between the inference result and a target label becomes larger, the target label indicating a correct answer of the inference, the second loss being a loss based on a contribution degree to the inference result of a plurality of elements included in the input data and the target label; and
updating the input data based on the first loss and the second loss.

9. A computer program product having a non-transitory computer readable medium including programmed instructions, wherein the instructions, when executed by a computer, cause the computer to perform:
inputting input data into a neural network and obtaining an inference result of the neural network;
calculating a first loss and a second loss, the first loss becoming smaller in value as a degree of matching between the inference result and a target label becomes larger, the target label indicating a correct answer of the inference, the second loss being a loss based on a contribution degree to the inference result of a plurality of elements included in the input data and the target label; and
updating the input data based on the first loss and the second loss.

* * * * *